(12) United States Patent
Holmes

(10) Patent No.: US 6,848,048 B1
(45) Date of Patent: Jan. 25, 2005

(54) METHOD AND APPARATUS FOR PROVIDING VERIFIABLE DIGITAL SIGNATURES

(75) Inventor: William S. Holmes, Santa Ana, CA (US)

(73) Assignee: Litronic Inc., Irvine, CA (US)

( * ) Notice: Subject to any disclaimer, the term of this patent is extended or adjusted under 35 U.S.C. 154(b) by 723 days.

(21) Appl. No.: 09/687,288

(22) Filed: Oct. 13, 2000

(51) Int. Cl.[7] .......................... H04L 9/00; G06F 11/30
(52) U.S. Cl. ................. 713/162; 713/165; 713/167; 713/176; 713/181; 713/193
(58) Field of Search ................ 713/162, 165, 713/167, 176, 181, 189, 193, 200; 382/119

(56) References Cited

U.S. PATENT DOCUMENTS

| | | | | |
|---|---|---|---|---|
| 5,001,752 A | * | 3/1991 | Fischer | 713/178 |
| 5,210,795 A | * | 5/1993 | Lipner et al. | 713/187 |
| 5,303,361 A | * | 4/1994 | Colwell et al. | 707/4 |
| 5,598,473 A | * | 1/1997 | Linsker et al. | 380/246 |
| 5,680,455 A | * | 10/1997 | Linsker et al. | 380/246 |
| 5,729,741 A | * | 3/1998 | Liaguno et al. | 707/104.1 |
| 5,995,756 A | * | 11/1999 | Herrmann | 717/178 |
| 6,028,938 A | | 2/2000 | Malkin et al. | |
| 6,029,150 A | | 2/2000 | Kravitz | |
| 6,081,610 A | * | 6/2000 | Dwork et al. | 382/119 |
| 6,091,835 A | * | 7/2000 | Smithies et al. | 382/115 |
| 6,224,387 B1 | * | 5/2001 | Jones | 434/252 |
| 6,282,535 B1 | * | 8/2001 | Pham et al. | 707/4 |
| 6,301,660 B1 | * | 10/2001 | Benson | 713/165 |
| 6,389,421 B1 | * | 5/2002 | Hawkins et al. | 707/10 |
| 6,393,566 B1 | * | 5/2002 | Levine | 713/178 |
| 6,611,599 B2 | * | 8/2003 | Natarajan | 380/203 |
| 6,681,329 B1 | * | 1/2004 | Fetkovich et al. | 713/189 |

OTHER PUBLICATIONS

N. Dwight Barnette. Introduction to Computer Graphic/Image File Formats. May 25, 1996.*

* cited by examiner

*Primary Examiner*—Emmanuel L. Moise

(57) ABSTRACT

A method and apparatus for providing verifiable digital signatures. In one embodiment, a method includes converting, on a computer system, digital data representative of a document into a predetermined format, and applying the predetermined format and a viewer program to a hash function to mathematically operate on the predetermined format and the viewer program and provide a message digest. The viewer program is used for viewing the predetermined format that is a representation of the document. The method further includes encrypting the message digest using a private key to provide a digital signature. In one embodiment, the predetermined format is a bitmap representation of the document. Moreover, in one embodiment, the method further includes incorporating a file in the digital signature, where the file includes one or more parameters specifying an environment of the computer system at the time of creation of the digital signature. The method and apparatus establishes integrity and trust in digital signatures, providing evidence that the sending and receiving parties are seeing the identical view of the digitally signed document(s).

23 Claims, 6 Drawing Sheets

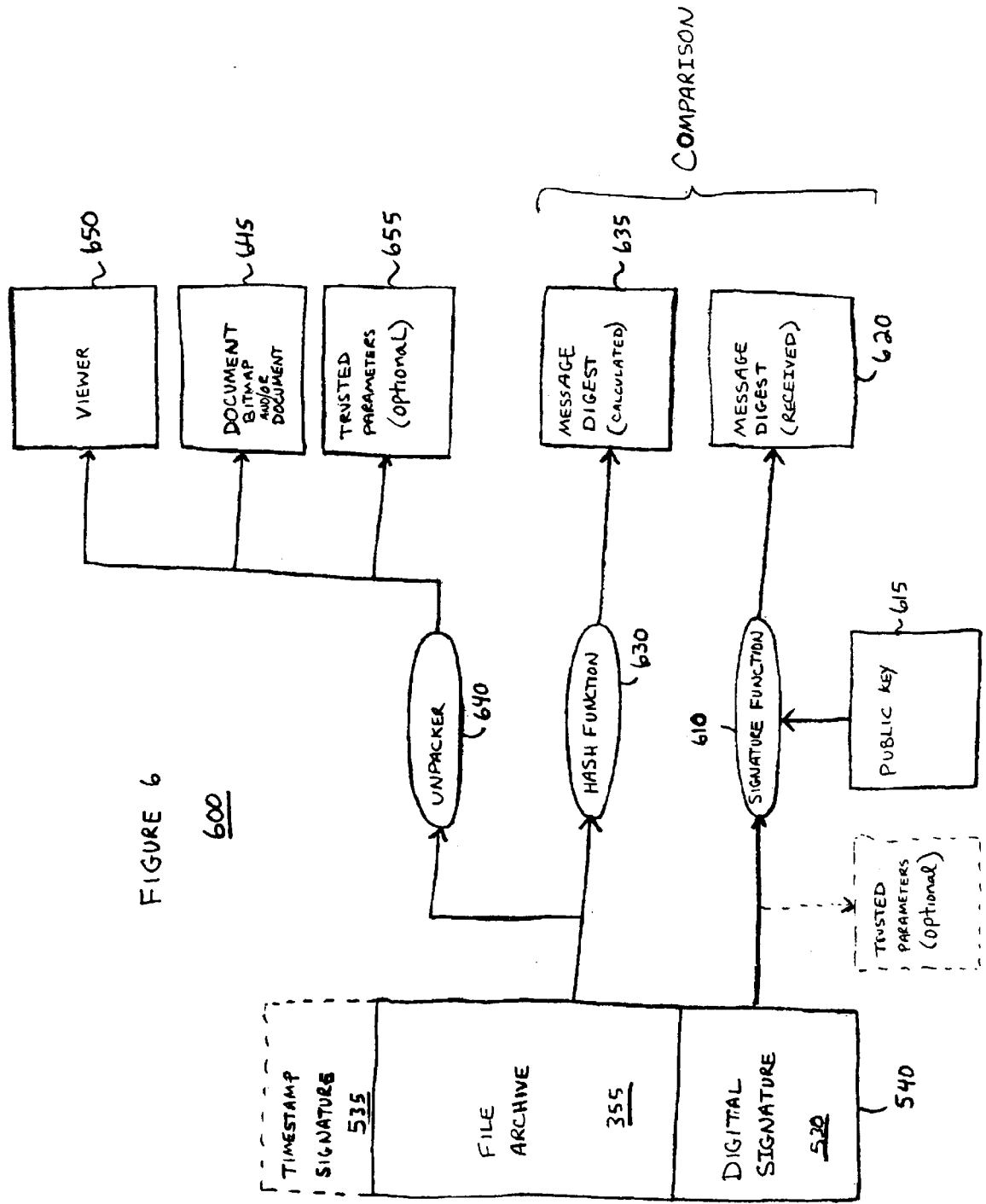

METHOD AND APPARATUS FOR PROVIDING VERIFIABLE DIGITAL SIGNATURES

BACKGROUND OF THE INVENTION

1. Field of the Invention

The present invention relates generally to security, and specifically, to verifiable digital signatures.

2. Description of the Related Art

With the advancement of technology, the Internet is becoming more and more an integral part of our personal and professional lives. The Internet is heavily depended on for transmitting and receiving messages and documents via electronic mail. In a setting where a document is a legally and binding contract, the recipient must determine the identity of the person sending the document, and whether that person is authorized to bind the entity that the person is representing to a legal contract. The recipient must also ensure that the sender cannot later deny agreeing to the content(s) of the document (typically referred to as non-repudiation). The sender may also want to rely on the document that is received by the recipient.

Digital signature technology was developed primarily to authenticate the signer of the document and to ensure that the document remains unchanged when viewed by a recipient. Digital signatures are based on public key infrastructure (PKI) technology and use a combination of hashing and encryption to "encapsulate" the document in a form that proves unequivocally who has sent the document and that the document is exactly the same as the original.

At first glance, it appears that digital signatures are watertight, but the problem arises from the fact that the electronic document (e.g., a ".doc" file created by Microsoft Word™) is in computer format and cannot be read by the individual without the use of a "viewer" or word processing program. Different "viewer" or word processing programs or even different releases of the same program may display the document with changed characteristics. For instance, paragraph or line numbers may change, italics or bold may appear or disappear.

Consequently, documents that are digitally signed may look different and have a different meaning, when the recipient receives it. With the addition of the document potentially being subjected to malicious programs and hackers, the situation becomes more exasperated and complex.

BRIEF SUMMARY OF THE INVENTION

The present invention comprises a method, apparatus, and/or computer program product for verifiable digital signatures. In one embodiment, a method includes converting, on a computer system, digital data representative of a document into a predetermined format, and applying the predetermined format and a viewer program to a hash function to mathematically operate on the predetermined format and the viewer program and provide a message digest. The viewer program is used for viewing the predetermined format that is a representation of the document. The method further includes encrypting the message digest using a private key to provide a digital signature.

Other embodiments are described and claimed herein.

BRIEF DESCRIPTION OF THE DRAWINGS

FIG. 6 illustrates a logical block/flow diagram on a receiver computer system, according to one embodiment of the present invention.

DETAILED DESCRIPTION

The present invention comprises a method, apparatus, and computer readable program code for providing verifiable digital signatures. Consequently, the method and apparatus establishes integrity and trust in the digital signatures, providing evidence that the sending and receiving parties are seeing the identical view of the digitally signed document(s).

In one embodiment, a method includes converting, on a computer system, digital data representative of a document into a predetermined format, and applying the predetermined format and a viewer program to a hash function to mathematically operate on the predetermined format and the viewer program and provide a message digest. The viewer program is used for viewing the predetermined format that is a representation of the document. The method further includes encrypting the message digest using a private key to provide a digital signature. In one embodiment, the predetermined format is a bitmap representation of the document.

As discussed herein, a "computer" or "computer system" is a product including circuitry capable of processing data. The computer system may include, but is not limited to, a general purpose computer systems (e.g., server, laptop, desktop, palmtop, etc.), personal electronic devices (e.g., palm pilot), office equipment, banking equipment (e.g., an automated teller machine), electronic devices (e.g., CD/DVD player, receiver/tuner, television, etc.), cash registers, networked devices and appliances, and the like. A "communication link" is generally defined as any medium over which information may be transferred such as, for example, electrical wire, optical fiber, cable, plain old telephone system (POTS) lines, wireless (e.g., satellite, radio frequency "RF", infrared, etc.) and the like. A module may be implemented in software and/or hardware.

Figure 1:
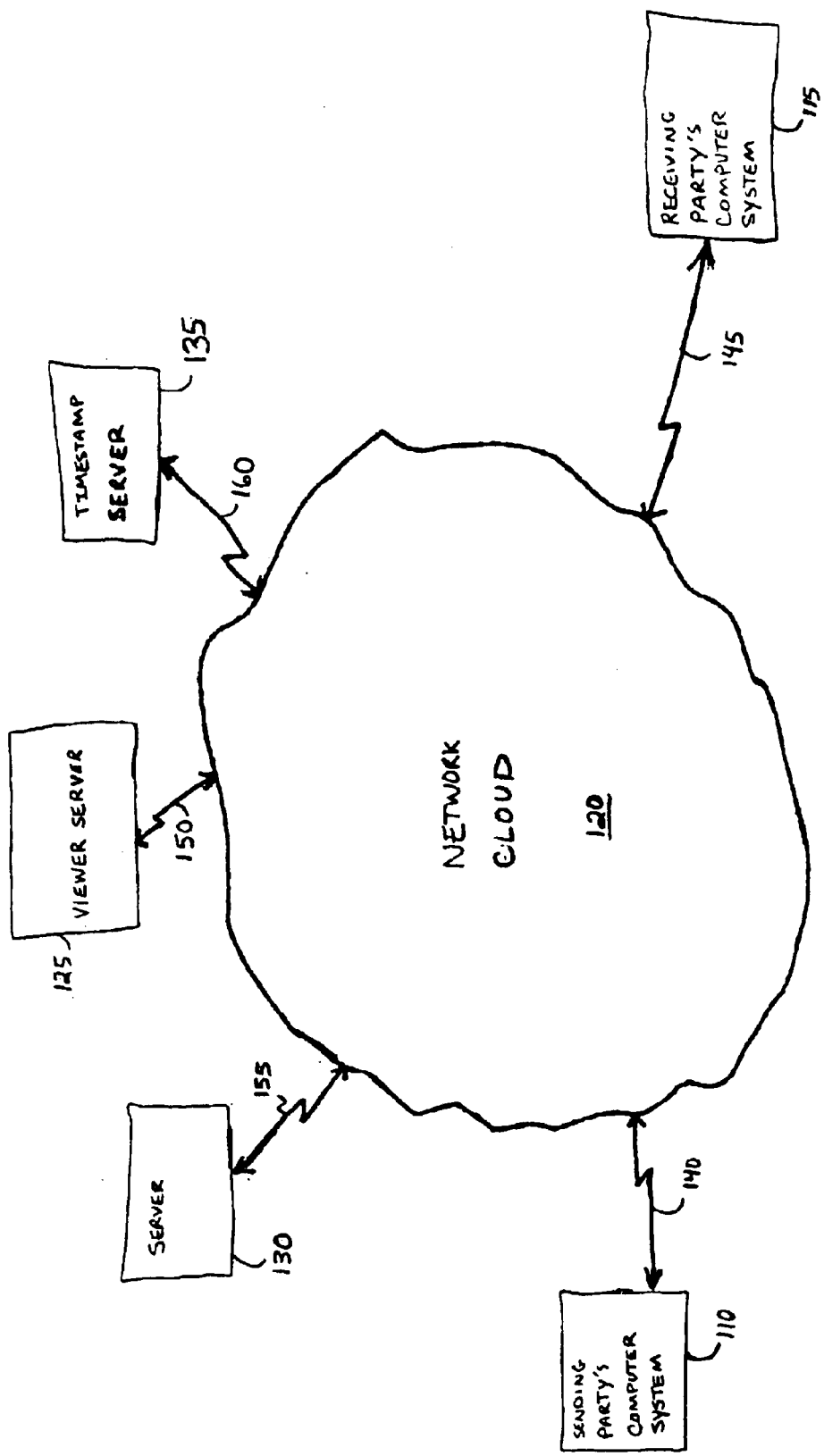
FIG. 1 illustrates a block diagram of an exemplary system for transmitting and receiving electronic documents over a network in accordance with one or more embodiment(s) of the present invention.

FIG. 1 illustrates a block diagram of an exemplary system 100 for transmitting and receiving electronic documents over a network in accordance with one or more embodiment(s) of the present invention. Referring to FIG. 1, the system 100 includes a sending party's ("sender") computer system 110 and a receiving party's ("receiver") computer system 115 coupled to a network cloud 120 via communication links 140 and 145, respectively. Each of the sender and receiver computer systems 110 and 115 includes a processor, memory, communication circuitry, etc. and software running thereon for digitally signing and verifying digitally signed documents according to the present invention. The sending computer system 110 is where an electronic document is created and/or digitally signed using the method and apparatus of the present invention, before transmission over the network cloud 120 to one or more recipients (e.g., a user at receiver computer system 115). On the receiver computer system 115, the digital signature is verified and the document is viewed and/or printed in accordance with the method and apparatus of the present invention.

The system optionally includes a viewer server 125 that is coupled to the network cloud 120 via communication link 150. The viewer server 125 is operated by a trusted third party that downloads, upon demand, an authorized viewer module to a receiver computer system for viewing documents, as will be described below in accordance with embodiments of the present invention. The server 125 may be an Internet portal that hosts web pages.

The system 100 further includes a sever 130 coupled to the network cloud 120 via communication link 155. In one embodiment, the server 130 downloads software programs and/or modules to the sender and/or receiving computer systems for implementing embodiments of the present invention, as will be described in more detail below. The server 130 may be an Internet portal including web pages or other type of access point. The server 130 may be maintained, owned, and/or operated by a third party for facilitating the verifiable digital signature method and apparatus of the present invention. Note that viewer server 125 and server 130 may be merged into a single server and/or owned or operated by a common trusted third party.

Also included in the system 100 is an optional timestamp server 135, which may be maintained by an independent entity. The timestamp server 135 is coupled to the network cloud 120 via communication link 160. The timestamp server 135 is a trusted third party that digitally signs a digitally signed document to provide timestamp information to authenticate the time of the digital signature.

In one embodiment, the network cloud 120 includes a local area network (LAN), wide area network (WAN), Internet, other global computer network, Intranet, one or more direct link connections, and/or combinations thereof. For sake of clarity and to provide a non-restrictive example, the network cloud 120 will also be referred to herein as the Internet.

Figure 2:
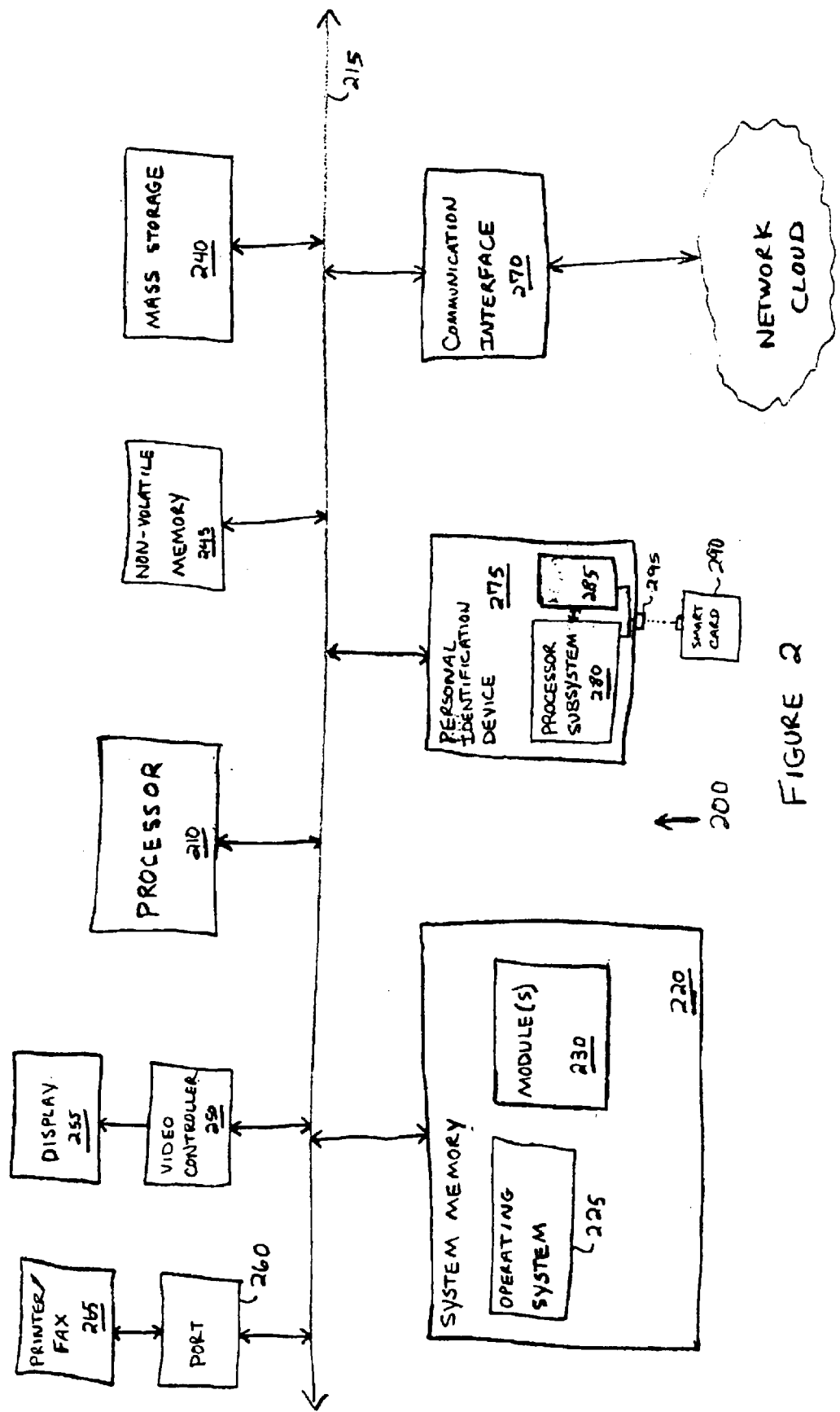
FIG. 2 illustrates a block diagram of a computer system, according to one embodiment of the present invention.

FIG. 2 illustrates a block diagram of a computer system 200, according to one embodiment of the present invention. For sake of clarity, the computer system 200 is described with respect to the sender and/or receiver computer system 110 or 115 (FIG. 1).

Referring to FIG. 2, the computer system 200 includes a processor 210 that is coupled to a bus structure 215. The processor 210 may include a microprocessor such as a Pentium™ microprocessor, microcontroller, or any other of one or more devices that process data. Alternatively, the computer system 200 may include more than one processor. The bus structure 215 includes one or more buses and/or bus bridges that couple together the devices in the computer system 200.

The processor 210 is coupled to a system memory 220 such as a random access memory (RAM), non-volatile memory 245 such as an electrically erasable programmable read only memory (EEPROM) and/or flash memory, and mass storage device 240. The non-volatile memory 245 includes system firmware such as system BIOS for controlling, among other things, hardware devices in the computer system 200.

The computer system 200 includes an operating system 225, and one or more modules 230 that may be loaded into system memory 220 from mass storage 240 at system startup and/or upon being launched. The operating system 225 includes a set of one or more programs that control the computer system's operation and allocation of resources. In one embodiment, the operating system 225 includes, but not limited or restricted to, disc operating system (DOS), Windows™, UNIX™, and Linux™. In one embodiment, one or more modules 230 are application programs, drivers, subroutines, and combinations thereof. One or more module (s) and/or application program(s) or portions thereof may be loaded and/or stored in the processor subsystem 280 and/or the "smart" card 290 (e.g., in non-volatile memory). One or more of the modules and/or application programs may be obtained via the Internet or other network.

On a sender computer system, one or more application programs and/or modules may be used to digitally sign documents in accordance with the present invention. The application program(s) and/or module(s) perform other functions including, but not limited to, (i) determining computer system hardware and software environments, setting up trip wire(s), taking tamper evident measures, and providing other trusted parameters, and (ii) packing a viewer program and the trusted parameters with the document. On a receiver computer system, one or more application programs and/or modules may be used to unpack the document, viewer program, and/or trusted parameters, verify the digital signature, and verify that the environment for viewing the singed document is the same as the environment when the document was digitally signed, among other things.

The mass storage device 240 includes (but is not limited to) a hard disk, floppy disk, CD-ROM, DVD-ROM, tape, high density floppy, high capacity removable media, low capacity removable media, solid state memory device, etc., and combinations thereof. In one embodiment, the mass storage 240 is used to store documents, where digitally signed or not, a viewer program/module, etc. The mass storage may also store the operating system and/or modules that are loaded into system memory 220 at system startup.

The computer system 200 also includes a video controller 250 for driving a display device 255, one or more peripheral devices such as a printer, fax, etc., and a communication interface 270 such as a T1 connection for communicating over the network cloud 120 (FIG. 1).

Also coupled to the bus structure 215 is an optional personal identification device 275 that includes a processor subsystem 280 and a card reader/writer 285, which may optionally include a keypad. The processor subsystem 280 includes a microprocessor or microcontroller, memory, and software running thereon for communicating with the card reader/writer 285 and other module(s) and/or devices in the computer system 200. In one embodiment, a user's private signing key and other information such as the user's personal information and PIN may be stored on a "smart" card 290, which includes a processor, memory, communication interface (e.g., serial interface), etc. Optionally, the personal identification device 275 or the card reader/writer 285 may include or may be coupled to one or more biometrics devices to scan in the user's thumb print, perform a retinal scan, and read other biometrics information. In such a case, the "smart" card may include a digital representation of the user's thumb print, retinal scan, and the like.

When digitally signing documents or other objects, the user connects the "smart" card 290 to the card reader/writer 285 or some other location on the personal identification device 275 (e.g., via a serial port 295). Optionally, the keypad on the card reader/writer 285 may include a display that prompts the user to "Enter in a PIN" and/or. "Provide biometrics authentication" (e.g., a thumb print). The PIN provided by the user is then uploaded to the "smart" card 290 via the serial port 295. The "smart" card then compares the PIN entered on the keypad and the PIN stored on the "smart" card. The "smart" card may also compare biometrics information (e.g., a user's thumb print) stored thereon with biometrics information scanned or otherwise obtained from the user. If there is a mismatch, the user may be prompted with a message such as "Incorrect PIN. Please Enter correct PIN". If they match, the "smart" card then requests the message digest (515, FIG. 5) from the computer system for encrypting the message digest with the user's private signing key. The message digest 515 may be stored in system memory 220, mass storage 240, and/or other location. The message digest may be retrieved through the processor subsystem 280 or directly from the processor 210. In either case, the "smart" card 290 reads the message digest, and encrypts the same with the user's private signing key to provide a digital signature. The memory on the "smart" card 290 includes encryption algorithm and software for generating the digital signature based on the private key.

In another embodiment, the comparison of the PIN stored on the "smart" card 290 and the PIN entered by the user on the keypad, and the encryption of the message digest with the user's private signing key may be performed by the processor subsystem 280. In such a case, the "smart" card downloads the PIN and the private signing key stored thereon to the processor subsystem 280.

Figure 3:
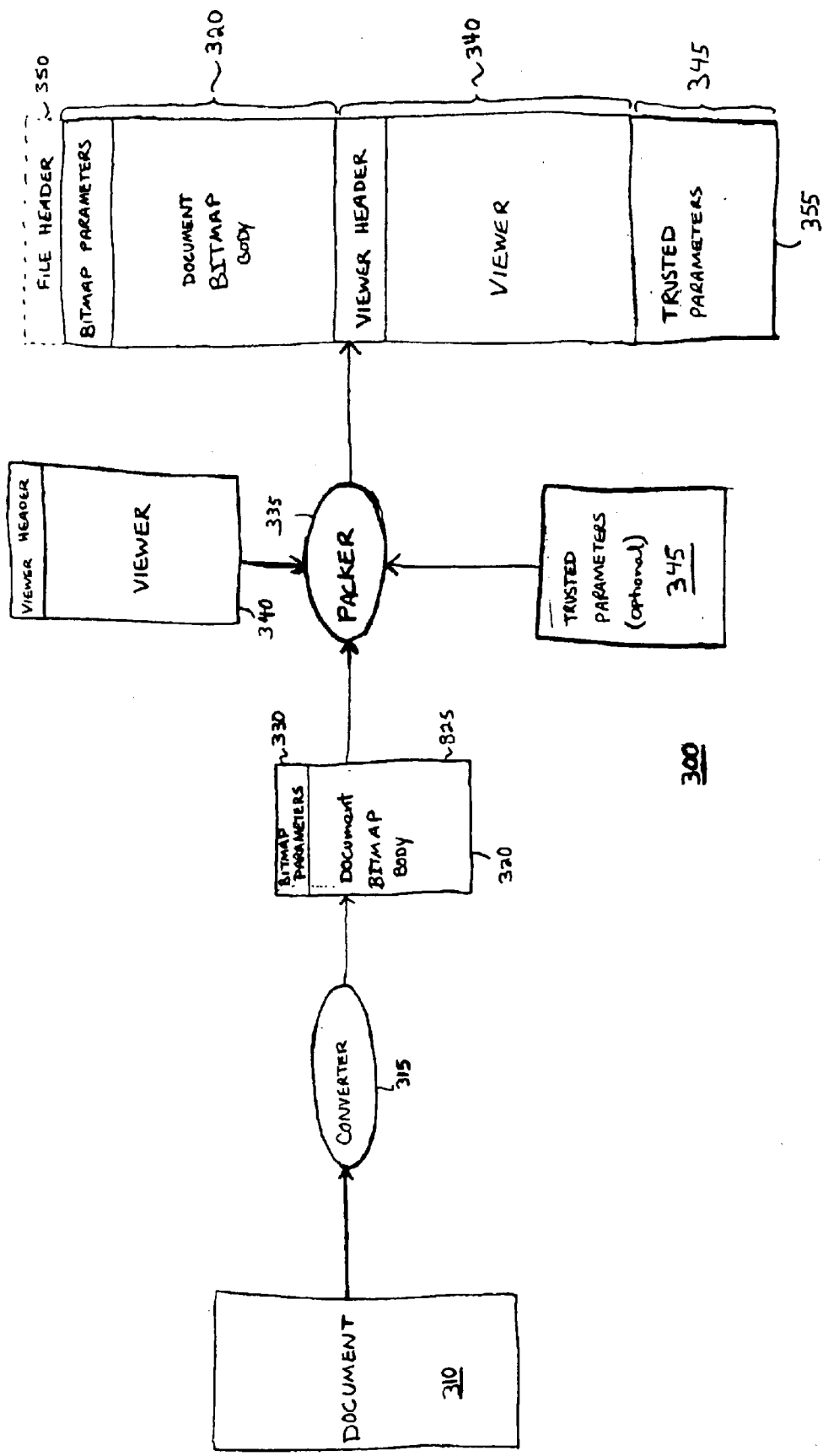
FIG. 3 illustrates a logical block/flow diagram for creating a file archive on a computer system to be digitally signed, according to one embodiment of the present invention.

FIG. 3 illustrates a logical block/flow diagram 300 for creating a file archive on a computer system to be digitally signed, according to one embodiment of the present invention. Referring to FIG. 3, a document 310 is created, stored, and/or loaded on a computer system (e.g., computer system 200 of FIG. 2). The document 310 may comprise a datafile, letter, memorandum, note, other document such as a document having legal significance (e.g., contract), or combinations thereof, where it may be important to authenticate the signer of the document, and that both the signer and recipient view the identical document. For example, the document 310 may be a contract between two or more parties that is to be digitally signed by the parties to create an enforceable and binding agreement. The document 310 may be created as a ".doc", ".wp", or any other format (e.g., using a word processor program).

Once created and ready to be digitally signed, the document 310 is applied to a converter module 315 which converts the document 310 into a predetermined format that can be reconstructed to view the document. In the current embodiment, the predetermined format is a document bitmap 320 or bitmap representation of the document 310, though any other format may be used. The document bitmap 320 includes a bitmap body 325, and bitmap parameters 330 in a header. Such parameters include, but are not limited to, the protocol, version, formatting, etc. of the bitmap. In one embodiment, the converter module 315 is an application program, module, and/or driver (e.g., a printer driver) that works with many different applications or word processors to produce a standard bitmap graphical image of the document, which can be viewed or printed (e.g., similar to that produced by using a fax/print option). In another embodiment, the converter module 315 may include a module that converts the format of the document 310 into formats such as ".gif ", ".jpg", ".tiff", ".pdf", etc. Once converted, the document may be viewed, printed, and/or faxed in the converted format.

The document bitmap 320, a viewer module 340, and optionally a trusted parameters file 345 are packed, appended, and/or concatenated by a packer module 335. In one embodiment, the viewer module 340 is an application program for viewing, printing, faxing, etc. the document bitmap body 325 using the associated bitmap parameters 330. The viewer module 340 includes a viewer header that specifies how the resolution, color levels, compression, etc. are to be handled by the viewer module 340. In one embodiment, the viewer module 340 is an executable program ".exe". In another embodiment, the viewer module 340 is a driver or other program.

The trusted parameters 345 include information regarding the environment of the computer system when the document is digitally signed. The trusted parameters 345 include, but not limited to, the software and hardware configurations of the computer system when the document is digitally signed, thereby providing "trip wire" and tamper evidence measures. Other parameters include details of the production system used to generate the digitally signed document and the viewing standards necessary to review it. The trusted parameters allow for a representation of the exact conditions present at the time the digital signature occurs. The parameters are optional and expandable to include any type of information with respect to the digital signature.

By capturing a snapshot of the environment at the moment of the digital signature, an entity has more assurance in the verification of the signature. Consequently, non-repudiation is more enforceable. The viewer also receives further assurances that what the viewer is viewing is exactly what was intended to be signed.

Once packed, the packer module 335 produces a file archive 355. The file archive 355 includes the document bitmap 320, the viewer module 340, and/or the (optional) trusted parameters 345. The file archive 355 may further include a file header 350 (dashed lines) for adding many other components and in a specified file format that may be understood by the sender and receiver computer systems. Consequently, the layout of the file archive 355 is exemplary, and may vary.

The process or technique of creating the file archive 355 may be implemented by one or more module(s) (either in software or hardware). In the case of a software module, such module may be downloaded from a third party entity (e.g., server 130 of FIG. 1) over the Internet.

Figure 4:
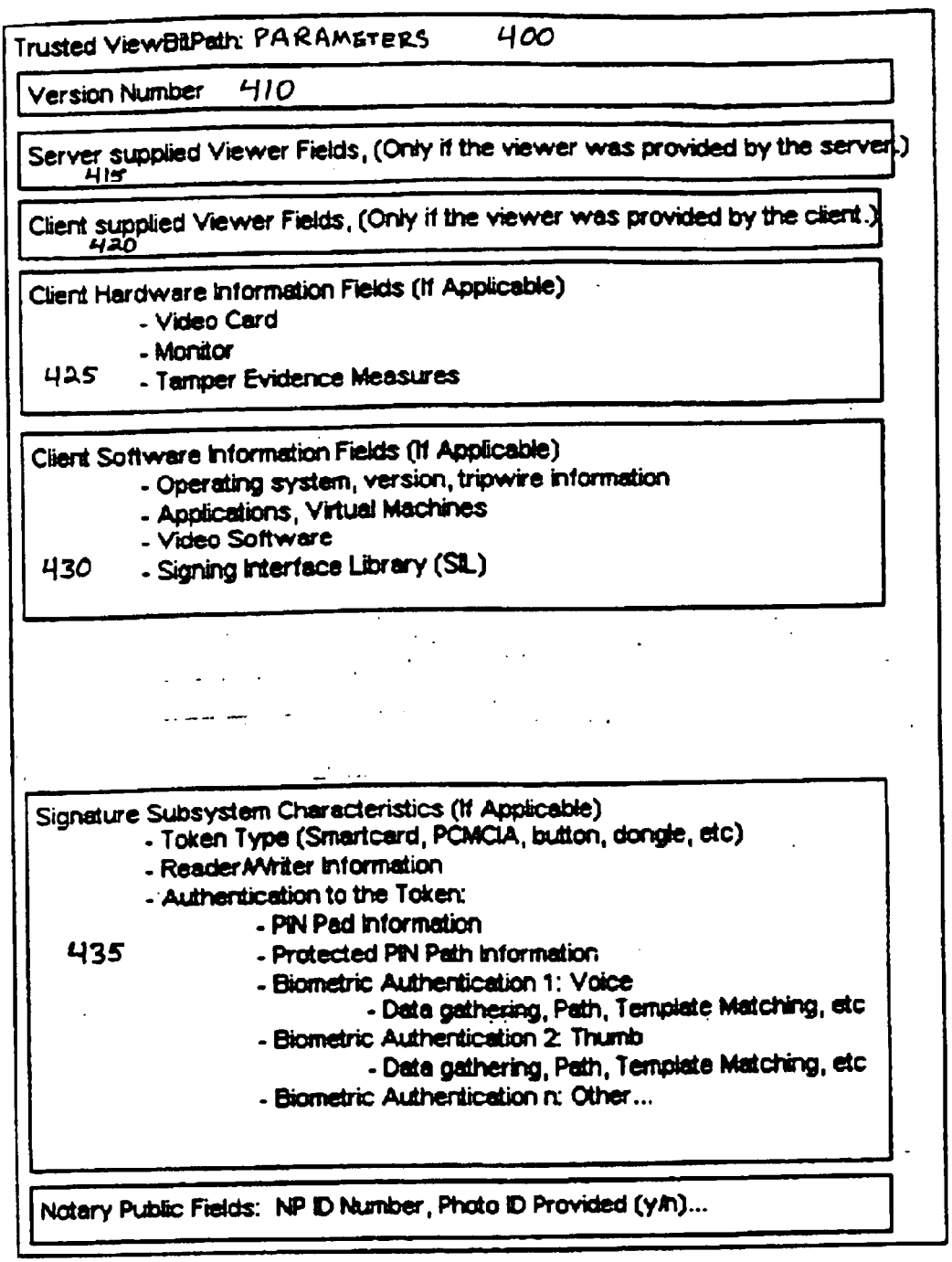
FIG. 4 shows a file containing the trusted parameters, according to one embodiment of the present invention.

FIG. 4 shows a file 400 containing the trusted parameters 345, according to one embodiment of the present invention. Referring to FIG. 4, the file 400 includes an optional version number field 410 specifying the format or protocol of the parameters, optional server supplied viewer field 415, optional receiver computer system viewer field 420, sending computer system hardware information field 425, sending computer system software information field 430, and signature subsystem field 435.

The server computer system viewer field 415 is utilized when the viewer module is not included in the file archive 355 (FIG. 3), but is downloaded from a remote server (e.g., viewer server 125, FIG. 1) coupled to the network cloud 120. Thus, the signor of the document can specify in this field the version, number, and other identifier to allow the recipient(s) to download the correct viewer from the remote server for viewing the document bitmap, which is representative of the document. The receiver computer system viewer field 420 is also utilized when the viewer module is not included in the file archive 355, but is located on the recipient's computer system, or may be obtained and loaded on the recipient's computer system. These fields specify the version, number, and other identifier of the viewer module to be used for viewing the document on the recipient's computer system. For example, these fields may include that the viewer used to sign the document is Microsoft™ Word™ xx-yyyy, version zz, where "xx-yyyy" is the month and year of release, and "zz" is the version number.

The hardware information field 425 specifies the hardware environment of the sender computer system at the time of signing. The field includes, but is not limited to, the video card and monitor type, version, etc. at the time of signing, and other tamper evidence measures. The software information field 430 specifies the software environment on the sender computer system at the time of signing. The field 430 includes, but is not limited to, the operating system, version of the operating system, tripwire information, applications and virtual machines, video software name and version, signing interface library (SIL) type and version, etc. In one embodiment, the virtual machine identifies the minimum number of components necessary to view the document.

The signature subsystem field 435 includes the token type such as "smart" card, PCMCIA card, button, dongle, etc., the reader/writer information (version, type, etc.), and other authentication information to the token. Such authentication may include PIN pad information, protected PIN path information, and one or more biometrics authentication information. The PIN pad information specifies keypad information such as the type, version, etc. The protected PIN path information specifies path of the PIN entered on the keypad. For example, if the keypad is directly coupled to the "smart" card, then the PIN may be sent to the "smart" card without any communication with the computer system, thus providing a further level of security (e.g., against "sniffing"). The biometrics authentication information may include the type of biometrics device being used (voice, thumb print, retinal scan, etc.), the version and protocol used, etc.

Figure 5:
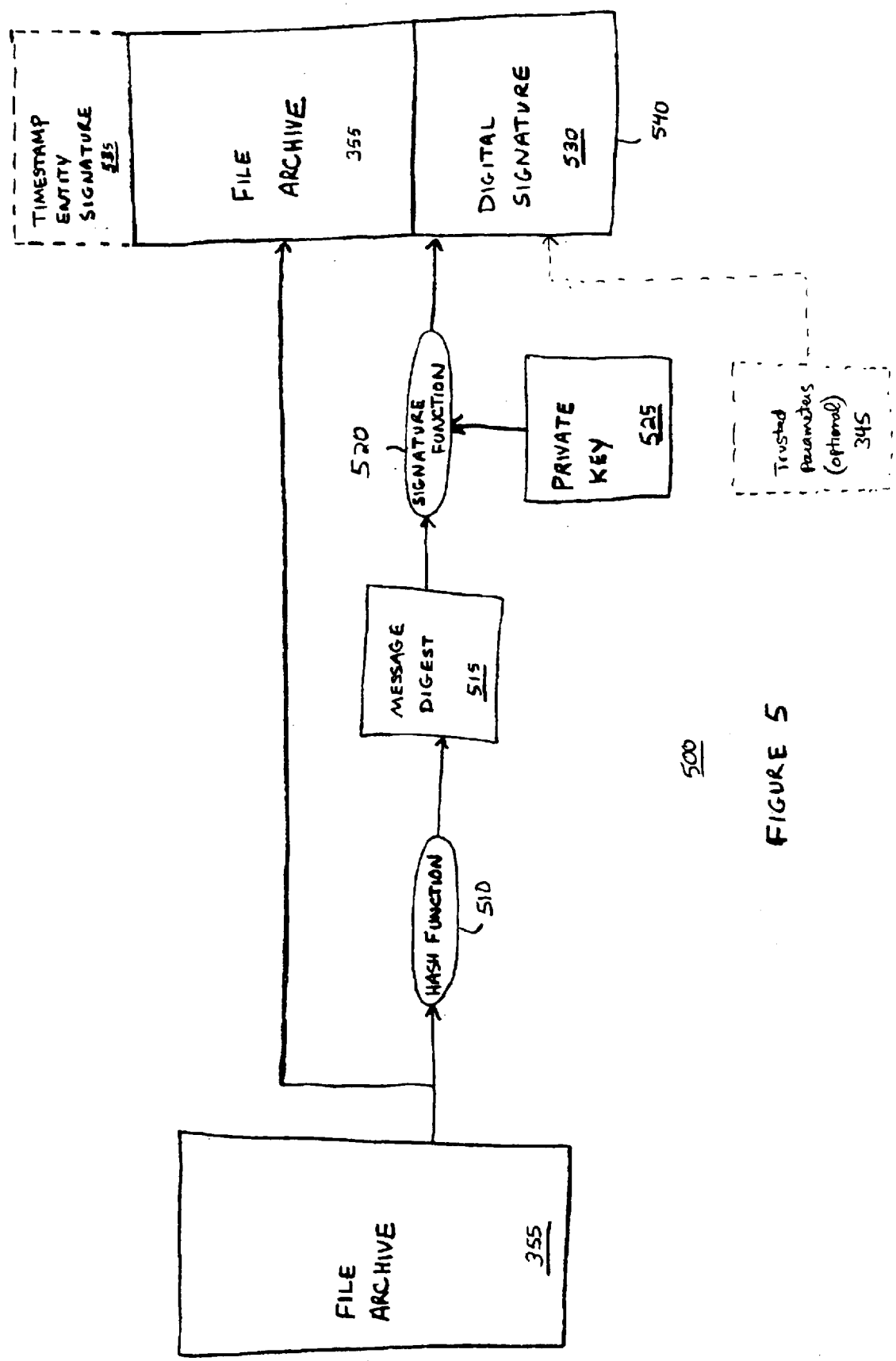
FIG. 5 illustrates a logical block/flow diagram for digitally signing a file archive, according to one embodiment of the present invention.

FIG. 5 illustrates a logical block/flow diagram 500 for digitally signing a file archive. Referring to FIG. 5, the file archive 355 is applied to a hash function 510. In one embodiment, the hash function 510 performs a mathematical algorithm on the file archive 355, and outputs a message digest 515, which is a string of bits. The hash function 510 takes a variable input (e.g., file archive 355), and generates an output that is generally smaller than the input. The message digest 515 is then fed to a signature function 520.

The signature function 520 uses the sender's private signing key 525 to encrypt the message digest 515. The private key 525 may be stored on the sender's computer system. The private key 525 may also be stored on a "smart" card 290 (FIG. 2). The message digest 515 may be sent to the "smart" card 290, which encrypts the message digest 515 with the user's private signing key to perform the signature function. The output of the signature function 520 is a digital signature 530, which is then packed, appended, and/or concatenated with the file archive 355. In one embodiment, the trusted parameters 345 (FIG. 3) may be incorporated into the digital signature 530, as shown by dashed lines, rather than packed or incorporated in the file archive 355. In such a case, the trusted parameters 345 are not encrypted with the user's private signing key. The digitally signed document 540 is then transmitted to the recipient(s), e.g., via the Internet, a direct connection, a floppy disk that is handed or delivered to the recipient(s), etc.

Optionally, prior to sending the digitally signed document 540 to the recipient(s), the document 540 may be transmitted to a trusted third party (e.g., operating the timestamp server 135, FIG. 1) for including a digital timestamp signature 535 to the document 540. The timestamp signature 535, in addition to including the time of the timestamp signature, may include the trusted time entity and other information. In one embodiment, the document 540 is transmitted over the Internet to the timestamp server 135 (FIG. 1), and sent back to the sender for transmission to the recipient(s). Alternatively, the timestamp server 130 digitally signs the document 540 with timestamp information and directly transmits the "timestamped" document 540 to the recipient(s).

FIG. 6 illustrates a logical block/flow diagram of a module 600 on a receiver computer system, according to one embodiment of the present invention. The receiver computer system receives (e.g., over the Internet) or loads (e.g., from a disk) the digitally signed document 540. The file archive 355 and digital signature 530 may also be stored on mass storage 240 (FIG. 2).

Referring to FIG. 6, if the document 540 includes a timestamp signature 535, the timestamp information is verified. The file archive 355 is applied to an unpacker module 640 which unpacks the file archive 355 into the document bitmap 645 (and/or optionally the original document), the viewer module 650, if included, and the trusted parameters 655, if packed in the file archive 355. The trusted parameters may also be obtained from the digital signature 530. Additionally, the digital signature 530 is applied to a signature function 610. Using the sender's public key 615, the digital signature 530 is decrypted, and the output is the message digest 620. The file archive 355 is also applied to a hash function 630, either before or after operation of the signature function 610, which operates on the file archive 355, using the same hash algorithm as used on the sending computer system, to yield a (calculated) message digest 635.

The (calculated) message digest 635 is then compared with the (received) message digest 620 to determine the integrity of the digital signature. If the two files are unequal, then the digital signature is not valid, and authentication cannot be confirmed. A message may be sent to a monitor stating that the digital signature is not valid. Consequently, viewing of the document may be disallowed. The receiver computer system may optionally send a message back to the sender computer system to notify the same of the mismatch.

If the two message digests are identical, the trusted parameters 655 may be examined to determine whether the receiver's computer system includes the same environment as the sender's computer system, when the document was digitally signed. In particular, the module 600 verifies the components of the computer system including the video card, monitor, other tamper evidence measures, operating system, applications, virtual machines, video software, etc. (as specified in fields 425 and 430, FIG. 4). If the module 600 encounters any software, hardware, virtual machine, video subsystem, etc. that it does not understand and/or trust, the module reports a warning and may not show the document. The module 600 may then create a new file (not shown) including the original file archive and information regarding the viewing environment (e.g., error points).

However, if the viewing environment is the same as the signing environment, then the module 600 executes the viewer module 650 to view the document bitmap 645.

The present invention may be implemented as a method, apparatus, system, etc. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A digital signature method, comprising:
   converting, on a computer system, digital data representative of a document into a predetermined format;
   applying the predetermined format and a viewer program to a hash function to mathematically operate on the predetermined format and the viewer program and provide a message digest, the viewer program for viewing the predetermined format that is a representation of the document; and
   encrypting the message digest using a private key to provide a digital signature.

2. The digital signature method of claim 1, further comprising incorporating into the digital signature a file including one or more parameters specifying an environment of the computer system at the time of creation of the digital signature.

3. The digital signature method of claim 2, wherein said one or more parameters includes one or both of a type and version of one or more of the following: a video card, monitor, operating system, application program, and signing interface library of the computer system.

4. The digital signature method of claim 1 further comprising timestamping the digital signature using a trusted source.

5. The digital signature method of claim 1 further comprising notarizing the digital signature.

6. The digital signature method of claim 1, wherein the predetermined format is a bitmap representation.

7. The digital signature method of claim 1 further comprising:
   transmitting the digital signature, predetermined format, and viewer program over a network to a receiver computer system;
   decrypting the digital signature using a public key corresponding to the private key, to recover the message digest;
   applying the predetermined format and the viewer program to a hash function, to mathematically operate on the predetermined format and the viewer program to provide a calculated message digest;
   comparing the calculated message digest with the recovered message digest; if the calculated message digest is identical to the recovered message digest, providing the predetermined format using the viewer program.

8. The digital signature method of claim 1, wherein providing the predetermined format using the viewer program comprises one or more of the following:
   viewing the predetermined format on a monitor using the viewer program;
   printing the predetermined format using the viewer program; and
   faxing the predetermined format using the viewer program.

9. The digital signature method of claim 1, wherein the viewer program is an executable program.

10. A computer readable medium having stored therein instructions for causing a central processing unit to execute the method of claim 1.

11. A system, comprising:
    a network;
    a first computer system including a processor and memory including digital data representative of a document and a viewer module, said processor to convert the document into a predetermined format, apply the predetermined format and viewer module to a hash function and provide a message digest, encrypt the message digest with a private key to provide a digital signature, and transmit the predetermined format, viewer module, and digital signature over the network; and
    a second computer system including a processor and memory, said processor to receive the predetermined format, viewer module, and digital private key, recover the message digest, apply the predetermined format and viewer module to a corresponding hash function to provide a calculated message digest, compare the calculated message digest with the recovered message digest, and view the predetermined format with the viewer program to provide a representation of the document, if the calculated message digest is identical to the recovered message digest.

12. The system of claim 11 wherein the network comprises an Internet.

13. The system of claim 11, wherein the predetermined format comprises a bitmap representation of the document.

14. The system of claim 11, wherein the viewer module is an executable program.

15. The system of claim 11, wherein the processor, on the first computer system, to further transmit a file including one or more parameters specifying an environment of the first computer system at the time of creation of the digital signature.

16. The system of claim 15, wherein said one or more parameters includes one or both of a type and version of one or more of the following: a video monitor, operating system, application program, and signing interface library of the first computer system.

17. The system of claim 11 further comprising a timestamp server coupled to the network, said timestamp server to receive over the network, digitally timestamp, and transmit over the network the predetermined format, viewer module, and digital signature.

18. A method, comprising:
    converting, on a computer system, a document into a predetermined format;
    appending the predetermined format with a viewer program to provide a file archive, the viewer program for viewing the predetermined format that is a representation of the document;
    applying the file archive to a hash function to mathematically operate on the file archive and provide a message digest; and
    encrypting the message digest using a private key to provide a digital signature.

19. The method of claim 18, wherein the predetermined format is a bitmap representation.

20. The method of claim 18 further comprising:

transmitting the digital signature and the file archive over a network to a receiver computer system;

decrypting the digital signature using a public key corresponding to the private key, to recover the message digest;

applying the file archive to a hash function, to mathematically operate on the file archive to provide a calculated message digest;

comparing the calculated message digest with the recovered message digest; if the calculated message digest is identical to the recovered message digest, providing the predetermined format using the viewer program.

21. The method of claim 20, wherein providing the predetermined format using the viewer program comprises one or more of the following:

viewing the predetermined format on a monitor using the viewer program;

printing the predetermined format using the viewer program; and faxing the predetermined format using the viewer program.

22. The method of claim 18, wherein the viewer program is an executable program.

23. A computer readable medium having stored therein instructions for causing a central processing unit to execute the method of claim 18.

* * * * *